United States Patent
Previnaire

[11] Patent Number: 5,497,960
[45] Date of Patent: Mar. 12, 1996

[54] DEVICE FOR AIRCRAFT AND AIRCRAFT PROVIDED WITH SUCH A DEVICE

[76] Inventor: Emmanuel E. Previnaire, Rue du Limbourg, 78, B-4000 Liege, Belgium

[21] Appl. No.: 120,463

[22] Filed: Sep. 14, 1993

[30] Foreign Application Priority Data

Sep. 14, 1992 [BE] Belgium .................... 09200803

[51] Int. Cl.$^6$ .................................................. B64C 27/56
[52] U.S. Cl. .................... 244/17.11; 244/17.25; 244/118.1; 244/190; 248/566; 248/568; 248/638; 348/117; 348/144; 348/195; 267/140.3
[58] Field of Search ............... 244/17.11, 118.01, 244/190; 354/65, 74; 267/140.11, 140.3, 141, 141.1, 153; 248/566, 568, 581, 634, 638; 188/268; 361/807, 809, 811; 348/114, 117, 208, 373, 374, 143, 144, 195; 206/521, 312.2

[56] References Cited

U.S. PATENT DOCUMENTS

| | | | |
|---|---|---|---|
| 3,035,799 | 5/1962 | Peirce | 267/140.3 |
| 3,564,134 | 2/1971 | Rue | 244/190 |
| 4,218,702 | 8/1980 | Brocard et al. | 348/144 |
| 4,286,777 | 9/1981 | Brown | 267/141.1 |
| 4,416,446 | 11/1983 | Murakami | 267/140.3 |
| 4,543,603 | 9/1985 | Laures | 348/195 |
| 4,752,791 | 6/1988 | Allred | 348/144 |
| 4,869,476 | 9/1989 | Shtarkman | 248/566 |
| 4,962,424 | 10/1990 | Durrenberg | 348/117 |
| 5,015,187 | 5/1991 | Lord | 244/190 |
| 5,033,722 | 7/1991 | Lammers | 267/141.1 |
| 5,089,895 | 2/1992 | Fraker et al. | 348/374 |
| 5,123,538 | 6/1992 | Groenewegen | 206/521 |

FOREIGN PATENT DOCUMENTS

| | | |
|---|---|---|
| 99809 | 2/1984 | European Pat. Off. . |
| 3152751 | 7/1983 | Germany . |
| 2168940 | 7/1986 | United Kingdom . |

*Primary Examiner*—Galen L. Barefoot
*Attorney, Agent, or Firm*—Sughrue, Mion, Zinn, Macpeak & Seas

[57] ABSTRACT

The present invention relates to a device for a motorized aircraft, said device having a room for containing an inspection apparatus, said device comprising at least two elements, a first element absorbing essentially vibrations with a frequency higher than a specific frequency, while the second element absorbs essentially vibrations with a frequency lower then said specific frequency, said first and second elements being linked together and placed the one with respect to the other, so that the .second element is adjacent to the said room. The invention relates also to an aircraft, such as a helicopter, with a camera placed in such a device.

14 Claims, 3 Drawing Sheets

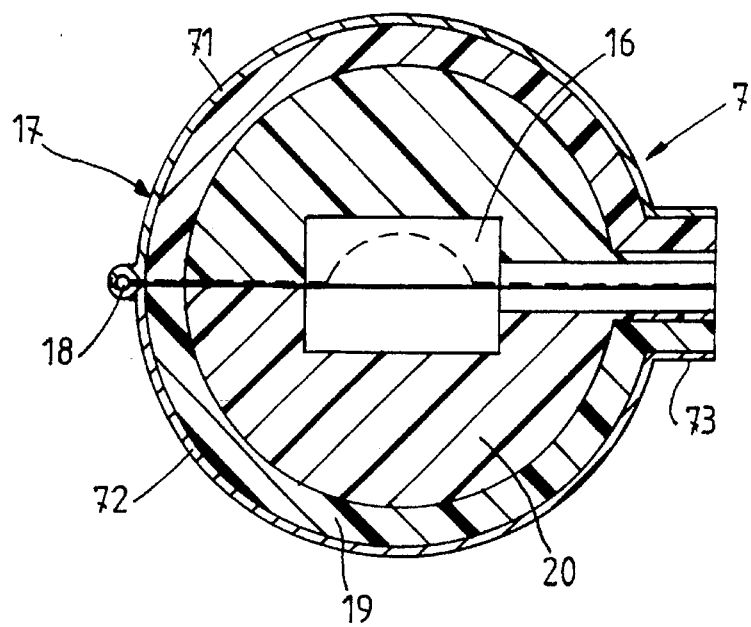
FIG. 3
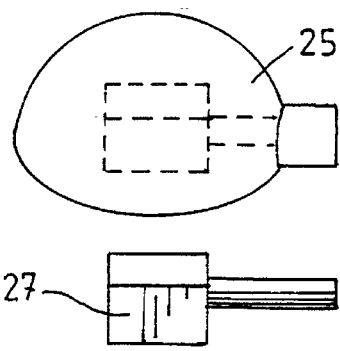
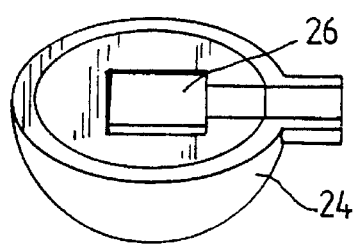
FIG. 4
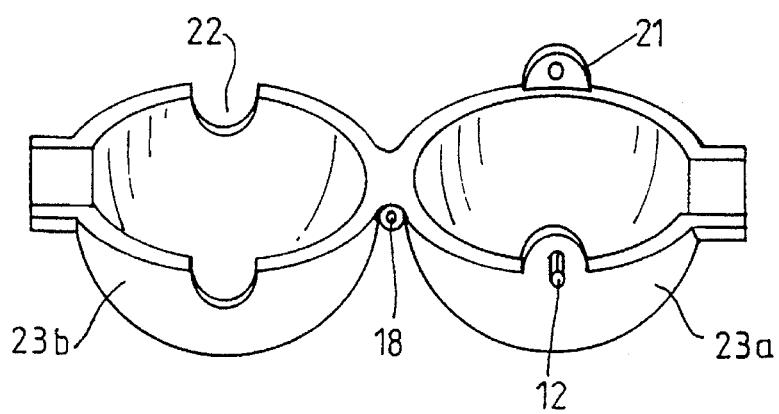

5,497,960

DEVICE FOR AIRCRAFT AND AIRCRAFT PROVIDED WITH SUCH A DEVICE

THE STATE OF THE ART

GB 2168940 discloses a helicopter provided with a rotable beam bearing at its ends photocameras. The photocameras are placed into a housing and are linked to a frame of the housing by means of radial shock absorbing units and axial shock absorbing units.

No reference is made in GB 2168940 to shock absorbing units placed in such a way that the vibrations due to the motor are first absorbed by a first element absorbing higher frequency vibration and then absorbed by a second element absorbing lower frequency vibration.

The absorbing units of GB 2168940 are placed in such a way that each absorbing unit absorbs independently from each other vibrations, a plurality of absorbing units absorbing the component of vibrations in a first axial direction, while a plurality of other units absorb the component of vibrations in a direction perpendicular to said first direction. Due to the location of the absorbing units according to GB 2168940, which do not form a substantially closed housing for the camera, the vibration, the direction of which is essentially axial, will be absorbed partly by the axial absorbing units, but the part of the vibration not absorbed will create, in the other absorbing units, vibration which will not be absorbed by said other absorbing units and which will be transferred to the camera, whereby variation of the shot plane, especially of a pan shot plane, occurs.

When using a scaled down telecontrolled helicopter with a camera, the camera is subjected to many vibrations essentially due to the main rotor located near the camera whereby the picture shift is blurred or imperfect.

Indeed, especially when using a scaled down helicopter, the camera is essentially subjected to two different kinds of vibration, namely vibrations due to the main rotor and vibrations due to the movement and acceleration of the helicopter. The present invention has for subject matter a device absorbing substantially completely the different kinds of vibration, whereby the camera is no more subjected to vibrations, and perfect pan shot views can be filmed.

BRIEF DESCRIPTION OF THE INVENTION

The invention relates to a device to be attached to an aircraft, such as a helicopter, with a motor, said device having a room or chamber for containing an inspection apparatus, said device comprising at least two elements, a first element absorbing essentially vibrations with a frequency higher than a specific frequency, while the second element absorbs essentially vibrations with a frequency, lower than said specific frequency, said first and second elements being linked together and arranged the one with respect to the other, so that the second element is adjacent to the said room. The first and second elements are arranged so that the vibrations are first absorbed by the first element and then by the second element.

Advantageously, the device has the form of a substantially spherical hollow housing, said housing being comprised of a supporting means, a first layer absorbing essentially vibrations with a frequency higher than a specific frequency, and a second layer absorbing essentially vibrations with a frequency lower than said specific frequency, the first layer being placed between the supporting means, and the second layer. When using such a device, a perfect absorption of the vibration can be ensured, and this whatever be the propagating direction of the vibration.

The two absorbing elements or layers, of the device according to the invention are for example such that the mean frequency of the vibrations absorbed by the first element or layer is greater than the mean frequency of the vibrations absorbed by the second element or layer.

The absorbing elements or layers are advantageously made of resilient expanded material such as polyurethane foam for the second layer or element and (expanded) polystyrene foam for the first layer or element.

Preferably the thickness of the second layer is greater than the thickness of the first layer, especially is at least twice the thickness of the first layer.

According to an embodiment, the device has the form of a substantially spherical hollow housing, said housing being comprised of a wall defining substantially a hollow sphere with an opening, said wall contacting on its inner face a first absorbing layer contacting a second absorbing layer, the latter defining an inner room or chamber for containing an inspection apparatus, such as a camera.

The invention relates also to an aircraft, in particular to a telecontrolled helicopter, comprising a motor, an inspection apparatus such as a camera, and a device according to the invention.

Advantageously, the aircraft comprises a system for rotating the device with respect to the aircraft so as to direct the camera towards an objective, and radio control or tele control means comprised of a receiver mounted on the helicopter, and a first control means managed by the pilot of the helicopter, said first control means receiving signals from a second control means managed by the cameraman, the helicopter comprising a rotor, the blade of which is inclinable so as to rotate the helicopter with respect to its yaw axis, the second control means sending information for modifying the inclination of the blade towards the first control means, said first control means comprising a means actuated by the pilot for modifying the inclination of the blade, a means actuated by the pilot for limiting the effect of the information received from the second control means on the modification of the inclination of the blade, and a mixing means in which information from the means actuated by the pilot and information from the second control means are mixed so as to define the information sent to the receiver of the helicopter for modifying the inclination of the blade.

BRIEF DESCRIPTION OF THE DRAWINGS

Other particularities will appear from the following detailed description in which reference is made to the attached drawings.

In said drawings,

FIG. 3 is a cross section view along the line III—III of the device shown in FIG. 1;

FIG. 4 is an exploded view of the device shown in FIG. 3;

DESCRIPTION OF A PREFERRED EMBODIMENT

Figure 1:
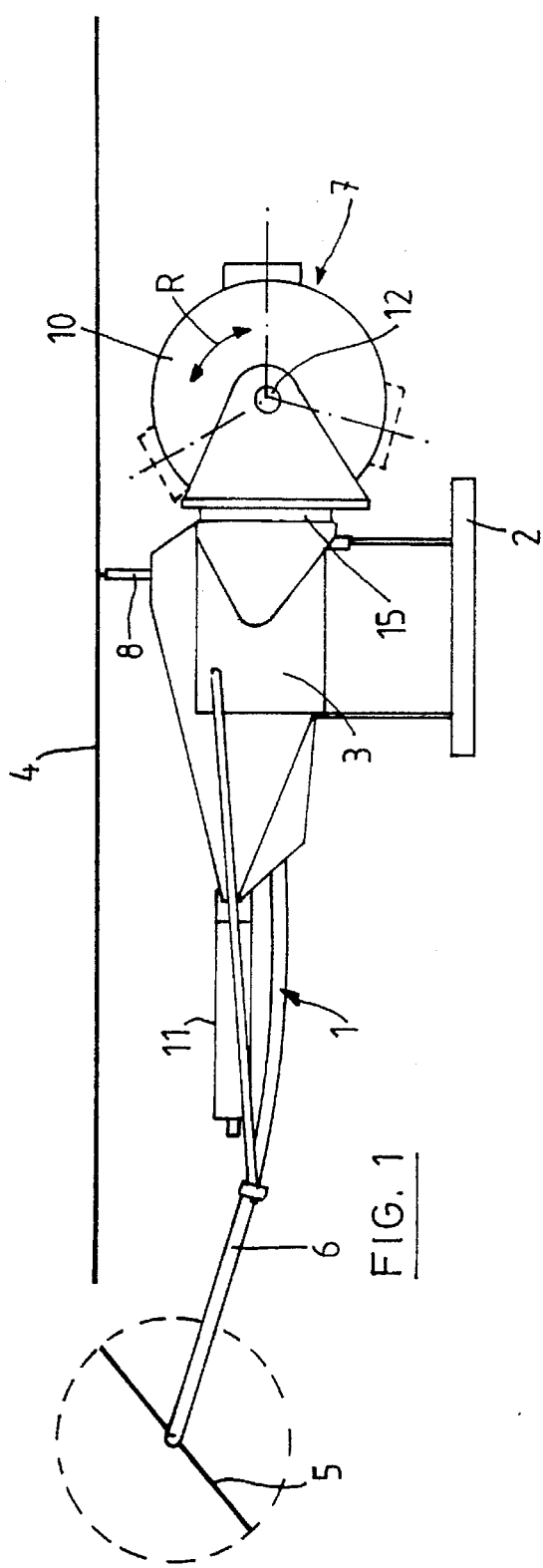
FIG. 1 is a side view of a helicopter provided with a device according to the invention.
Figure 2:
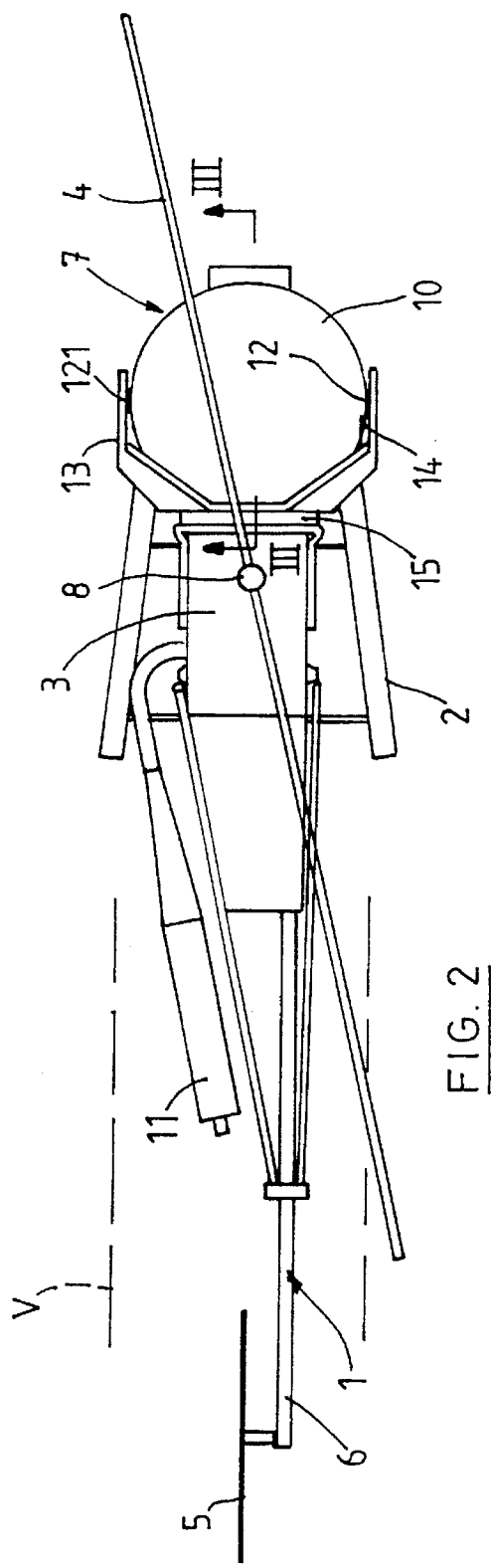
FIG. 2 is an upper view of the helicopter shown in FIG. 1.

The helicopter shown in FIG. 1 and 2 comprises a metallic structure 1 provided with feet 2 and bearing a motor 3 driving into rotation the blades 4 creating essentially the ascending force and the forward movement of the helicopter and the blades 5 located at the tail or end 6 of the helicopter, said latter blades 5 being essentially intended to allow a pivoting of the end 6 around the yaw axis, i.e. to direct the direction of the forward movement of the helicopter or to direct the head 7 of the helicopter.

The blades 4 are mounted on a shaft 8 driven by a rotor while the blades 5 are mounted on a shaft 9 driven the motor 3 via a chain (not shown). So as to obtain an excellent stability of the helicopter, the blades 5 stretch substantially in a plane containing the axis of the shaft 8 of the blades 4.

The head 7 of the helicopter has a penetrating surface 10 of the helicopter. Due to the substantially spherical form of this head 7 and due to the fact that the motor 3, the end 6, the blades 5 and the exhaust 11 are located in the axial projection (volume V) of the surface 10, any rotation R of the head does not modify the penetration resistance of the helicopter so that the control and movements of the helicopter are facilitated.

The head 7 bears two co-axial parts of shaft 12, 121 which are engaged into openings of the two arms 13 of the structure 1.

A motor 14 drives into rotation said parts of shaft 12, 121 with respect to the arms. The rotation of the motor shaft 14 drives in rotation the parts of shaft 12, 121 by a means known as such (for example a chain). By means of this motor 14, the device 7 is able to move between the end positions shown in dashed lines in FIG. 1.

The arms 13 are attached to the structure 1 with insertion of a means 15 absorbing vibrations of the structure 1 due to the motor 3. Such a means 15 is for example a rubber element.

FIG. 3 shows in cross-section the head 7 of the helicopter shown in FIG. 1.

This head 7 is a device having an inner room or chamber 16, the form of which corresponds substantially to the form of the camera (film camera). The head comprises a housing 17 substantially spherical and made of synthetic material, such as polyester, expoxy resin . . . , reinforced with fibres, aramide (Kevlar®) or honeycombed materials (Nomex®). Said housing, the wall thickness of which is for example 1 to 3 mm, is comprised of two parts 71, 72 linked together by means of an articulation 18. The inner surface of the housing is covered by two superimposed layers 19, 20 made of materials absorbing vibrations, in particular due to the motor.

The layer 19 adjacent to the inner surface is made of expanded polystyrene (Frigolite®), while the layer 20 in which the room 16 is made of polyurethane foam. The thickness of the layer 20 is at least twice the thickness of the layer 19. The mean frequency of the vibrations absorbed by the layer 19 is greater than the mean frequency of the vibrations absorbed by the layer 20.

The housing 71, 72 is provided with a sleeve tube 73 intended to form a channel between the inner space of the housing 71, 72 and the outer space. This channel allows the camera to film or to take air photo.

Advantageously, the mean frequency of the vibrations absorbed by the layer 19 is lower than the mean frequency of the vibrations absorbed by the means 15.

The foam of the layer 20 is advantageously obtained from a composition having a foaming factor or an expansion factor higher than 50, preferably equal to about 75 with an element having a weight of 3 kg and a foam contacting surface of 1350 cm$^2$ said element creating a force opposed to the foam expansion force.

The outer wall of the housing has for example a density of 50 g/dm$^2$.

By means of the articulation 18, the housing 71, 72 can be opened so as to allow to take away from said housing the layers 19, 20 and the camera 27.

The layers 19, 20 have been shaped so as to form two half shells 24, 25. Each half shell is hemi-spherical and has a hollow 26 corresponding substantially to the half of the room 16. Said half shells are intended to fill the inner substantially spherical volume defined by the housing.

The part 72 of the housing has two ears 21 to which is attached a part of shaft 12. 121, while the part 71 has two recesses in which the ears are placed when the housing is closed. The closing of the housing can be ensured by every known system 23a, 23b such as elastic means, latch, etc.

It is obvious that the parts 71, 72 can, according to possible embodiments, be separated the one from the other so as to have access to the layers 19, 20 and to the camera 27.

If the device 7 of the helicopter shown in FIG. 1 can pivot around the axis 12, 121, this device, according to other embodiments, can be stationary or can pivot around two or three perpendicular axes.

Figure 5:
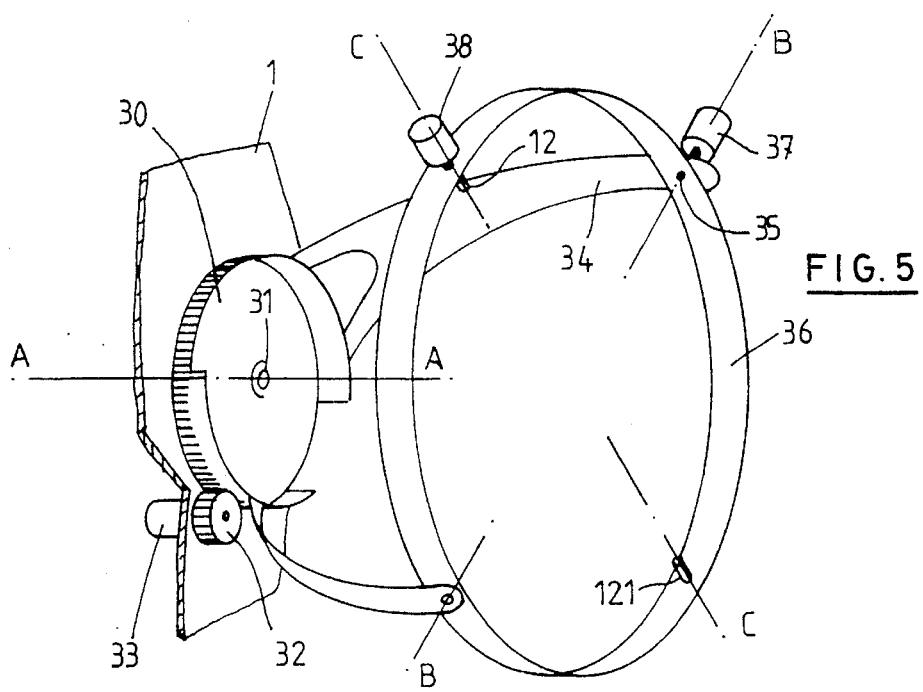
FIG. 5 is a schematic view of an embodiment of a system for directing the device.

FIG. 5 is a view of an embodiment of a system allowing the orientation of the device by pivoting it around three perpendicular axes A—A, B—B and C—C.

Said system comprises a plate 30 mounted on a shaft 31 secured to the structure 1. The lateral edge of the plate 30 is provided with teeth gearing with teeth of a wheel 32 mounted on the shaft of a motor 33. The motor 33 allows a pivoting of the plate 30 around the axis A—A. The plate 30 bears two arms 34, the free end of which has an opening in which stretches a shaft 35 secured to a ring 36. One of said arms 34 bears a motor 37, the shaft of which passes through the opening of the end of the arm and is secured to the ring 36. As the two shafts attached to the ring 36 are co-axial (axis B—B), the rotation of the motor shaft allows to pivots the ring 36 around the axis B—B.

The ring 36 has two openings stretching along an axis C—C perpendicular to the axis B—B. Said ring 36 bears a motor 38, the shaft 12 of which stretches through an opening of the ring and to which a device according to the invention is attached. The shaft 121 is introduced in the opening of the ring 36 opposed to the opening of the ring 36 through which the shaft 12 stretches. The rotation of the shaft 12 due to the motor 38 allows a pivotement of the device (not shown) around the axis C—C.

Figure 6:
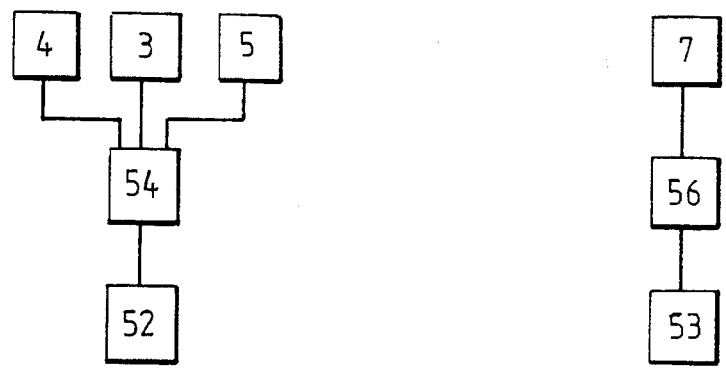
FIG. 6 is a schematic view of a control circuit of the helicopter shown in FIG. 1.
Figure 6:
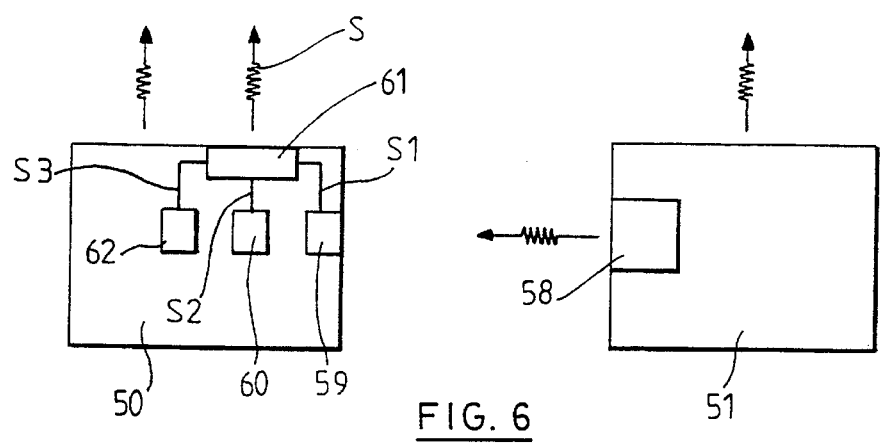

FIG. 6 shows schematically a control circuit for a helicopter provided with a camera. The movement of the helicopter is controlled by the pilot and possibly by the cameraman, while the movement or orientation of the device is controlled by the cameraman.

The system comprises two radio emitters 50, 51, a first 50 being actuated by the pilot, while the second is actuated by the cameraman. Signals of transmitter 50 are sent to a receiver 52 mounted on the helicopter, said signals being intended to control the movement of the helicopter. The receiver 52 sends signals to means 54, for example, for controlling or modifying the inclination of the blades 4, the carburant content of the mixture used in the motor 3, the inclination of the blades 5.

Signals of transmitter 51 are sent to a receiver 53 arranged to control the direction of the device 7 via a means 56 acting for example on motors 33, 37, 38; to control the camera.

The system is advantageously provided with a means so that the pilot and possibly the cameraman can control the inclination of the blades 5, i.e. the pivoting of the helicopter around its yaw axis. Such a means allows for example the cameraman to control up to 50%, preferably up to 30% of the inclination of the blades 5, Said means is constituted of a control organ 58 of transmitter 51 sending a signal to a receiver 59 of transmitter 50, a control organ 60 of transmitter 50 actuated by the pilot and intended to determine the allowable effect of the cameraman on the inclination of the blades 5, and a mixing means 61 of transmitter 50 receiving the signal (S1) of control organ 58 via the receiver 59, the signal (S2) of the control organ 60 (maximum effect of the cameraman) and a signal (S3) of a control organ 62 actuated by the pilot and corresponding to the inclination of the blades 5 as required by the pilot.

In said means, the signal S actuating the inclination of the blades 5 is calculated for example as follows:

$$S=(S1)\times(S2)+(S3)\times(1-(S2))$$

Said signal is then sent to the receiver 52 so as to control the inclination of the blade.

It is obvious that, if necessary or required, the mixing means can be mounted on the helicopter, for example can be a part of a receiver mounted on the helicopter.

Assuming, the cameraman or the pilot can control completely the inclination of the blades 5, although the pilot is able via a switch to decide that the cameraman is no more able to control the inclination of the blades 5, the cameraman can possibly decide the movement of the helicopter around its yaw axis, i.e. the tilt axis of the camera.

Thus, this control system for a helicopter, telecontrolled by means of a receiver mounted on the helicopter, is characterized by a first control means managed by the pilot of the helicopter, said first control means receiving signals from a second control means managed by the cameraman, the helicopter comprising a rotor, the blade of which is inclinable so as to rotate the helicopter with respect to its yaw axis, the second control means sending signals for modifying the inclination of the blade towards the first control means, said first control means comprising a means actuate by the pilot for modifying the inclination of the blade, a means actuated by the pilot for limiting the effect of the signal received from the second control means on the modification of the inclination of the blade, and a mixing means in which signals from the second control means are mixed so as to define the information sent to the receiver of the helicopter for modifying the inclination of the blade.

What we claim is:

1. A device to be attached to an aircraft provided with a motor, said device having the form of a substantially spherical hollow housing, said housing comprising: an outer wall defining a substantially hollow sphere with an opening therein; a first vibration-absorbing layer disposed inside said housing and in contact with an inner face of said outer wall; a second vibration-absorbing layer disposed inside said housing and in contact with an inner face of said first layer, said second layer defining an inner chamber for containing an inspecting apparatus, the first layer absorbing essentially vibrations with a frequency higher than a specific frequency, while the second layer absorbs essentially vibrations with a frequency lower than said specific frequency, said first and second layers being linked together and arranged the one with respect to the other so that vibrations are first absorbed by the first layer before being absorbed by the second layer.

2. The device according to claim 1, in which the mean frequency of the vibrations absorbed by the first layer is greater than the mean frequency of the vibrations absorbed by the second layer.

3. The device according to claim 1, in which the absorbing layers are made of resilient expanded material.

4. The device according to claim 1, in which the thickness of the second layer is greater than the thickness of the first layer.

5. The device according to claim 1, in which the thickness of the second layer is at least twice the thickness of the first layer.

6. The device according to claim 1, in which the second layer is a polyurethane foam.

7. Device according to claim 1, in which the first layer is made of expanded polystyrene.

8. The device according to claim 1, in which the hollow housing comprises:

(a) a supporting means constituted by two pans which are linked together by means of an articulation, and each of which defines a hollow hemispherical space, whereby the two parts are movable between a closed position, in which the hollow housing is substantially closed, and an open position, and (b) two half shells, made of said first and second layers, and being each placed into the hollow hemispherical space of the two parts, respectively, whereby, in the closed position of the two parts, an inner chamber is defined between said two half shells, an open channel stretching from said chamber towards the supporting means.

9. An aircraft provided with a motor, an inspection apparatus, and a device having the form of a substantially spherical hollow housing, said housing comprising: an outer wall defining a substantially hollow sphere with an opening therein; a first vibration-absorbing layer disposed inside said housing and in contact with an inner face of said outer wall; a second vibration-absorbing layer disposed inside said housing and in contact with an inner face of said first layer, said second layer defining an inner chamber for containing an inspection apparatus, the first layer absorbing essentially vibrations with a frequency higher than a specific frequency, while the second layer absorbs essentially vibrations with a frequency lower than said specific frequency, said first and second layers being linked together and arranged the one with respect to the other so that vibrations are first absorbed by the first layer before being absorbed by the second layer.

10. Aircraft according to claim 9, in which the inspection apparatus is a camera.

11. Aircraft according to claim 9, in which the aircraft is a telecontrolled helicopter.

12. Aircraft according to claim 9, in which the inspection apparatus is a camera, said aircraft comprising a system for rotating the device with respect to the aircraft so as to direct the camera towards an objective.

13. The aircraft according to claim 12, said aircraft being a helicopter actuated by a pilot and a cameraman, and comprising:

a structure with two opposite ends, a head mounted at one end of the structure and containing a camera, a motor, carried by said structure, for driving into rotation two sets of blades, a first set creating essentially an ascending force and a forward movement of the helicopter, while the second set is mounted on a shaft carried at the end of the structure opposite to the one end at which the head is mounted, the blades of said second set being inclinable so as to rotate the structure for modifying the direction of the forward movement of the structure, means for controlling the direction of the camera, a first receiver mounted on the helicopter, for receiving signals from an on-board transmitter actuated by the cameraman, a second receiver, mounted on the helicopter, for receiving signals from an on-board transmitter actuated by the pilot of the helicopter, means, mounted on the helicopter, for receiving signals from the second receiver for modifying the inclination of the second set of blades;

wherein the transmitter actuated by the pilot has
(a) a receiver for receiving signals emitted by the transmitter actuated by the cameraman for modifying the inclination of the blades of the second set,
(b) means, actuated by the pilot, for limiting the signals received by the receiver from the transmitter actuated by the cameraman, and
(c) mixing means mixing the limited signals of the cameraman and the signals actuated by the pilot for modifying the inclination of the blades, so as to form a mixed signal which is sent to the second receiver by the transmitter actuated by the pilot.

14. An aircraft according to claim 12, said aircraft being a helicopter, actuated by a pilot and a cameraman, and comprising:

a structure with two opposite ends, a head mounted at one end of the structure and containing a camera, a motor carried by said structure for driving into rotation two sets of blades, a first set creating essentially an ascending force and a forward movement of the helicopter, while the second set is mounted on a shaft carried at the end of the structure opposite to the one end at which the head is mounted, the blades of said second set being inclinable so as to rotate the structure for modifying the direction of the forward movement of the structure, means for controlling the direction of the camera, a first receiver, mounted on the helicopter, for receiving signals from a transmitter actuated by the pilot of the helicopter, and means, mounted on the helicopter, for receiving signals from the second receiver for modifying the inclination of the second set of blades;

wherein the transmitter actuated by the pilot has
(a) a receiver for receiving signals emitted by the transmitter actuated by the cameraman for modifying the inclination of the blades of the second set, and
(b) means actuated by the pilot for limiting the signals received by the receiver from the transmitter actuated by the cameraman; and wherein the second receiver further comprises a mixing means mixing the limited signals of the cameraman and the signals actuated by the pilot for modifying the inclination of the blade, so as to form a mixed signal which is sent to the second receiver by the transmitter actuated by the pilot.

* * * * *